(12) United States Patent
Aharoni et al.

(10) Patent No.: US 11,528,134 B2
(45) Date of Patent: Dec. 13, 2022

(54) AUTHENTICATION USING TRANSFORMATION VERIFICATION

(71) Applicant: International Business Machines Corporation, Armonk, NY (US)

(72) Inventors: Ehud Aharoni, Kfar Saba (IL); Allon Adir, Kiryat Tivon (IL); Dov Murik, Haifa (IL); Ariel Farkash, Shimshit (IL); Omri Soceanu, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 305 days.

(21) Appl. No.: 16/828,294

(22) Filed: Mar. 24, 2020

(65) Prior Publication Data

US 2021/0306147 A1    Sep. 30, 2021

(51) Int. Cl.
*H04L 9/08* (2006.01)
*G06F 17/18* (2006.01)
*G06F 21/32* (2013.01)

(52) U.S. Cl.
CPC ............ *H04L 9/0866* (2013.01); *G06F 17/18* (2013.01); *G06F 21/32* (2013.01)

(58) Field of Classification Search
CPC ..... H04L 9/0866; H04L 9/3231; G06F 17/18; G06F 21/32; G06F 21/602
See application file for complete search history.

(56) References Cited

U.S. PATENT DOCUMENTS

2004/0193893 A1*  9/2004  Braithwaite ........... G06V 40/10
                                                           713/186
2018/0203808 A1   7/2018  Unagami et al.
(Continued)

FOREIGN PATENT DOCUMENTS

KR         101838432 B1    2/2017
KR         102008101 B1    6/2018

OTHER PUBLICATIONS

Datta, Pratish et al., "Functional Encryption for Inner Product with Full Function Privacy," Public-Key Cryptography—PKC, Feb. 2016, 35 pages.

(Continued)

*Primary Examiner* — Meng Li
(74) *Attorney, Agent, or Firm* — Barry D. Blount

(57) ABSTRACT

An example system includes a processor to receive, at a setup or sign-up, a first cipher including a biometric template transformed using a first transformation and encrypted using a secret key, a second cipher including a security vector encrypted using the secret key, a third cipher including the biometric template transformed using a second transformation and encrypted, and a fourth cipher including an encrypted second security vector. The processor can receive, at a runtime or sign-in, a fifth cipher and a sixth cipher. The processor can verify that the fifth cipher includes a second biometric template transformed using the first transformation and encrypted using the secret key and that the sixth cipher includes the second biometric template transformed using the second transformation by testing a format attribute of the transformation functions using comparisons of inner products. The processor can authenticate a user based on the Euclidean distance between the first cipher and the sixth cipher not exceeding a threshold in response to detecting that the transformations are verified.

20 Claims, 7 Drawing Sheets

(56) References Cited

U.S. PATENT DOCUMENTS

2019/0394039 A1\* 12/2019 Higo .................... H04L 9/0894
2021/0203364 A1\* 7/2021 Condo ................. H03M 13/13
2021/0336792 A1\* 10/2021 Agrawal ................ H04L 9/085

OTHER PUBLICATIONS

Zhou, Kai et al., "PassBio: Privacy-Preserving User-Centric Biometric Authentication," IEEE Transactions on Information Forensics and Security (vol. 13, Issue: 12, Dec. 2018), May 21, 2018, 29 pages.

\* cited by examiner

AUTHENTICATION USING TRANSFORMATION VERIFICATION

BACKGROUND

The present techniques relate to authentication. More specifically, the techniques relate to authentication of users using encryption.

SUMMARY

According to an embodiment described herein, a system can include processor to receive, at a setup or sign-up, a first cipher including a biometric template transformed using a first transformation and encrypted using a secret key, a second cipher including a security vector encrypted using the secret key, a third cipher including the biometric template transformed using a second transformation and encrypted, and a fourth cipher including an encrypted second security vector. The processor can also further receive, at a runtime or sign-in, a fifth cipher and a sixth cipher. The processor can also verify that the fifth cipher includes a second biometric template transformed using the first transformation and encrypted using the secret key and that the sixth cipher includes the second biometric template transformed using the second transformation by testing a format attribute of the transformation functions using comparisons of inner products. The processor can also further authenticate a user based on the Euclidean distance between the first cipher and the sixth cipher not exceeding a threshold in response to detecting that the transformations are verified.

According to another embodiment described herein, a method can include receiving, via a processor at a setup or sign-up, a first cipher including a biometric template transformed using a first transformation and encrypted using a secret key, a second cipher including a security vector encrypted using the secret key, a third cipher including the biometric template transformed using a second transformation and encrypted, and a fourth cipher including an encrypted second security vector. The method can further include receiving, via the processor at a runtime or sign-in, a fifth cipher and a sixth cipher. The method can also further include verifying, via the processor, that the fifth cipher includes a second biometric template transformed using the first transformation and encrypted using the secret key and that the sixth cipher includes the second biometric template transformed using the second transformation by testing a format attribute of the transformation functions using comparisons of inner products. The method can also include authenticating, via the processor, a user based on the Euclidean distance between the first cipher and the sixth cipher not exceeding a threshold in response to detecting that the transformations are verified.

According to another embodiment described herein, a computer program product for authentication can include computer-readable storage medium having program code embodied therewith. The computer readable storage medium is not a transitory signal per se. The program code executable by a processor to cause the processor to receive, at a setup or sign-up, a first cipher including a biometric template transformed using a first transformation and encrypted using a secret key, a second cipher including a security vector encrypted using the secret key, a third cipher including the biometric template transformed using a second transformation and encrypted, and a fourth cipher including an encrypted second security vector. The program code can also cause the processor to receive, at a runtime or sign-in, a fifth cipher and a sixth cipher. The program code can also cause the processor to verify that the fifth cipher includes a second biometric template transformed using the first transformation and encrypted using the secret key and that the sixth cipher includes the second biometric template transformed using the second transformation by testing a format attribute of the transformation functions using comparisons of inner products. The program code can also cause the processor to authenticate a user based on the Euclidean distance between the first cipher and the sixth cipher not exceeding a threshold in response to detecting that the transformations are verified.

DETAILED DESCRIPTION

Figure 1:
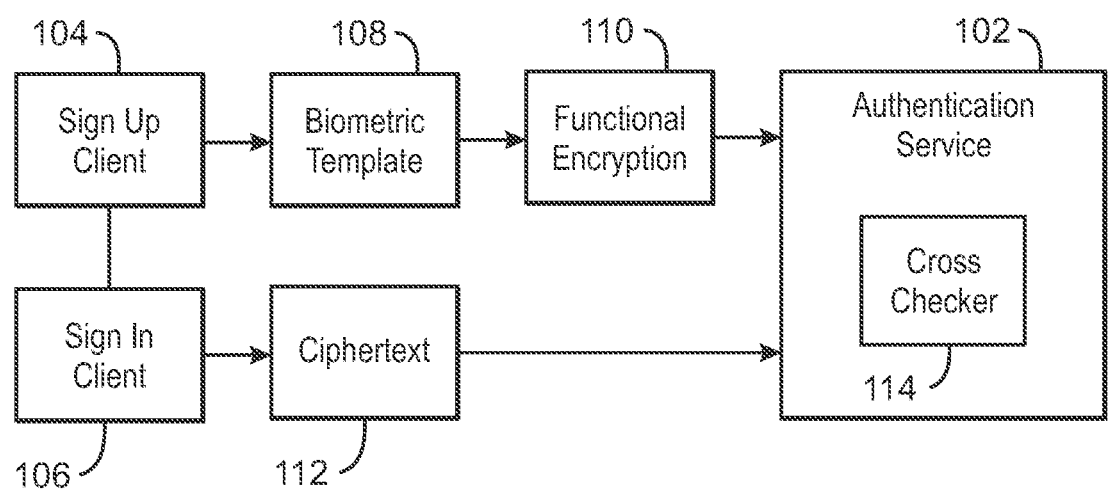
FIG. 1 is a block diagram of an example system for authentication using a transformation verification.

Functional encryption (FE) or homomorphic encryption (HE) may be used to compute a function on ciphertexts C1 and C2. As used herein, functional encryption is a generalization of public-key encryption that allows one to compute an encrypted function over what some ciphertext is encrypting. The computation may use some public information, and the result of the computation is unencrypted. As used herein, homomorphic encryption is a form of encryption that allows computation on ciphertexts, generating an encrypted result which, when decrypted, matches the result of the operations as if they had been performed on a plaintext. For example, a plaintext may be a biometric template, corresponding to a particular face, thumbprint, eye feature, etc. The result of FE or homomorphic encryption may be the same result as the application of the function corresponding to the encrypted plaintext $P_0$ on the corresponding plaintexts, $P_0$ and $P_1$. For example, in FE the result may be in plaintext, and in HE the result may be encrypted. For example, an FE scheme may include a client generating a private master-key. The client uses the master-key and a vector y to compute a secret key SK(y). The client can then use the master-key and a vector x to compute an encryption of x EN(x). Anyone who has secret key SK(y) and encryption EN(x) can run a decryption function DEC(SK(y), EN(x)) that results in the inner product $<x,y>$. This calculation can be performed without learning or knowing about the values of x and y.

In some examples, this FE scheme can be used as an underlying layer for a new scheme that computes a Euclidean distance. For example, the vector y can be transformed using a transformation function $TR_1$. Similarly the x vector can be transformed using a function $TR_2$. The client computes a master-key and uses the master-key to compute $SK(TR_1(y))$ and $EN(TR_2(x))$. Thus, the inner product decryption function DEC applied to $SK(TR_1(y))$ and $EN(TR_2(x))$ may be used to calculate the squared Euclidean distance between x and y.

Such a scheme may be used for authentication of users on a server. As one example, such scheme may be used by a cloud service for preserving privacy of users authenticating with the cloud service. For example, a biometric authentication may be implemented by first computing a biometric template that identifies the user as $P_0$ at sign-up and sending the template $P_0$ to the server. The server may store biometric templates of all users. When users attempt to sign-in later, the client may compute a new biometric template $P_1$ that is sent to the server. The server may then compute the distance between templates $P_0$ and $P_1$, and authenticate the user if the templates are close enough. For example, the distance used may be a Euclidean distance.

In some examples, an FE scheme for Euclidean distances may be implemented by having each user generate a master-key. During a sign-up, each user may provide $SK(TR_1(P_0))$ to the server. During a sign-in, the users may provide $EN(TR_2(P_1))$. This may allow the server to compute the Euclidean distance between $P_0$ and $P_1$ without actually knowing the values of $P_0$ or $P_1$.

However, one vulnerability of such a FE scheme for Euclidean distances is that malicious users may try to illegally authenticate as a different user by sending an illegal cipher text C'. Specifically, the transformation $TR_1(P_0)$ may be defined by the equation:

$$TR_1(x)=(\Sigma x_i^2, 1, -2x_1, -2x_2, \ldots, 2x_n)  \quad \text{Eqn. 1}$$

and the transformation $TR_2(P_1)$ may be defined by the equation:

$$TR_2(x)=(1, \Sigma x_i^2, x_1, x_2, \ldots, x_n) \quad \text{Eqn. 2}$$

In some cases, a malicious user can attempt to replace $TR_2$ with some other transformation $TR_2'$ that meets the Euclidean distance threshold. For example, the malicious user may use $TR_2'(x)=(0,0,0,0,0,0,\ldots)$. In this case, when the server computes the inner product of $TR_1(P_0)$ and $TR_2'(x)$, the result may be 0. The service may then authenticate the malicious user because 0 is below the Euclidean distance threshold. In another example, the malicious user may use $TR_2''(x)=(1, \Sigma x_i^2-1000, x_1, x_2, \ldots)$. In this case, the server may end up with a Euclidean distance between $P_0$ and x−1000. This may increase the chances that a malicious user can succeed being authenticated without knowing the real template $P_0$.

According to embodiments of the present disclosure, an system includes a processor that can receive, at a setup or sign-up, a first cipher including a biometric template transformed using a first transformation and encrypted using a secret key, a second cipher including a security vector encrypted using the secret key, a third cipher including the biometric template transformed using a second transformation and encrypted, and a fourth cipher including an encrypted second security vector. The processor can receive, at a runtime or sign-in, a fifth cipher and a sixth cipher. The processor can also verify that the fifth cipher includes a second biometric template transformed using the first transformation and encrypted using the secret key and that the sixth cipher includes the second biometric template transformed using the second transformation by testing a format attribute of the transformation functions using comparisons of inner products. The processor can further authenticate a user based on the Euclidean distance between the first cipher and the sixth cipher not exceeding a threshold in response to detecting that the transformations are verified. Thus, embodiments of the present disclosure enable additional security to be provided when authenticating using Euclidean distances. For example, various attacks using modified transformation functions may be avoided using the techniques described herein.

With reference now to FIG. 1, a block diagram shows an example system for authentication using a transformation verification. The example system 100 can be implemented using the transformation function cross check 200 of FIG. 2 and the method 300 of FIG. 3 via the computing device 400 of FIG. 4.

The system 100 of FIG. 1 includes an authentication service 102. The system includes a signup client 104 and a sign in client 106, both communicatively coupled to the authentication service 102. In various examples, the signup client and the sign in client may be different or the same machine. For example, the signup client 104 may be used by a user to sign up with the authentication service 102. The sign in client 106 may be used by a user to sign in to a service that is protected by the authentication service 102. The system 100 includes a biometric template 108. The system 100 also includes a functional encryption 110 shown being applied to the biometric template 108. The system 100 also further includes a ciphertext 112. The authentication service 102 includes a cross checker 114.

In the example of FIG. 1, the authentication service 102 may use FE for inner product in order to calculate a Euclidean distance between a vector $F_0$ received during a system set-up or client sign-up and a vector $F_1$ received at runtime or sign-in. The authentication service 102 may determine if a distance between vectors $F_0$ and $F_1$ is below a given threshold. For example, the authentication service 102 may provide a biometric authentication. In the example of FIG. 1, the sign up client 104 may provide a biometric template 108 that is functionally encrypted using functional encryption 110 and received as encrypted vector $EN(TR_1(F_0))$ at the authentication service 102. The sign in client 106 may provide a ciphertext 112 that is received as vector $F_1$ at sign-in. For example, the ciphertext 112 may be have been generated based on another biometric template generated during sign-in that is encrypted using the functional encryption 110. In some examples, however, the ciphertext 112 may be an illegally generated ciphertext 112 generated using a functional encryption with a hacked transformation function. For example, the ciphertext may be a biometric template transformed using some transformation function $TR_2'$ rather than the transformation function $TR_2$. In some examples, the ciphertext 112 may be a mathematical object not created using any functional encryption scheme, but designed to generate a small Euclidean distance.

Still referring to FIG. 1, the cross checker 114 may ensure that during runtime or sign in the client 104 submits a valid value for $EN(TR_2(F_1))$. For example, the cross checker 114 can that the transformation function $TR_2$ was used as specified by protocol. In some examples, the cross checker 114 can identify a member of the range of encryption function EN based on the algorithm used by encryption function EN and the properties of the algebraic groups on which encryption function EN relies. Thus, the cross checker 114 can be used to check the validity of the ciphertext in all aspects except the validity of $F_1$ itself.

In various examples, a set of additional vectors including encrypted and transformed vectors may be used during both setup or sign-up and at runtime or sign-in. The cross checker 114 can calculate inner products among pairs of these vectors to validate proper usage of transformation function $TR_2$. For example, the cross checker 114 can perform the transformation function cross check 200 of FIG. 2.

In some examples, if the cross checker 114 detects that the cross check passes, then the authentication service 102 may authenticate the user. For example, the authentication service 102 may calculate a distance between the stored template for a user and the template provided by the client at sign-in. In some examples, if the distance is detected as being less than a threshold, then the user may be granted access to one or more services, such as a cloud-based service.

It is to be understood that the block diagram of FIG. 1 is not intended to indicate that the system 100 is to include all of the components shown in FIG. 1. Rather, the system 100 can include fewer or additional components not illustrated in FIG. 1 (e.g., additional client devices, or additional resource servers, etc.).

Figure 2:
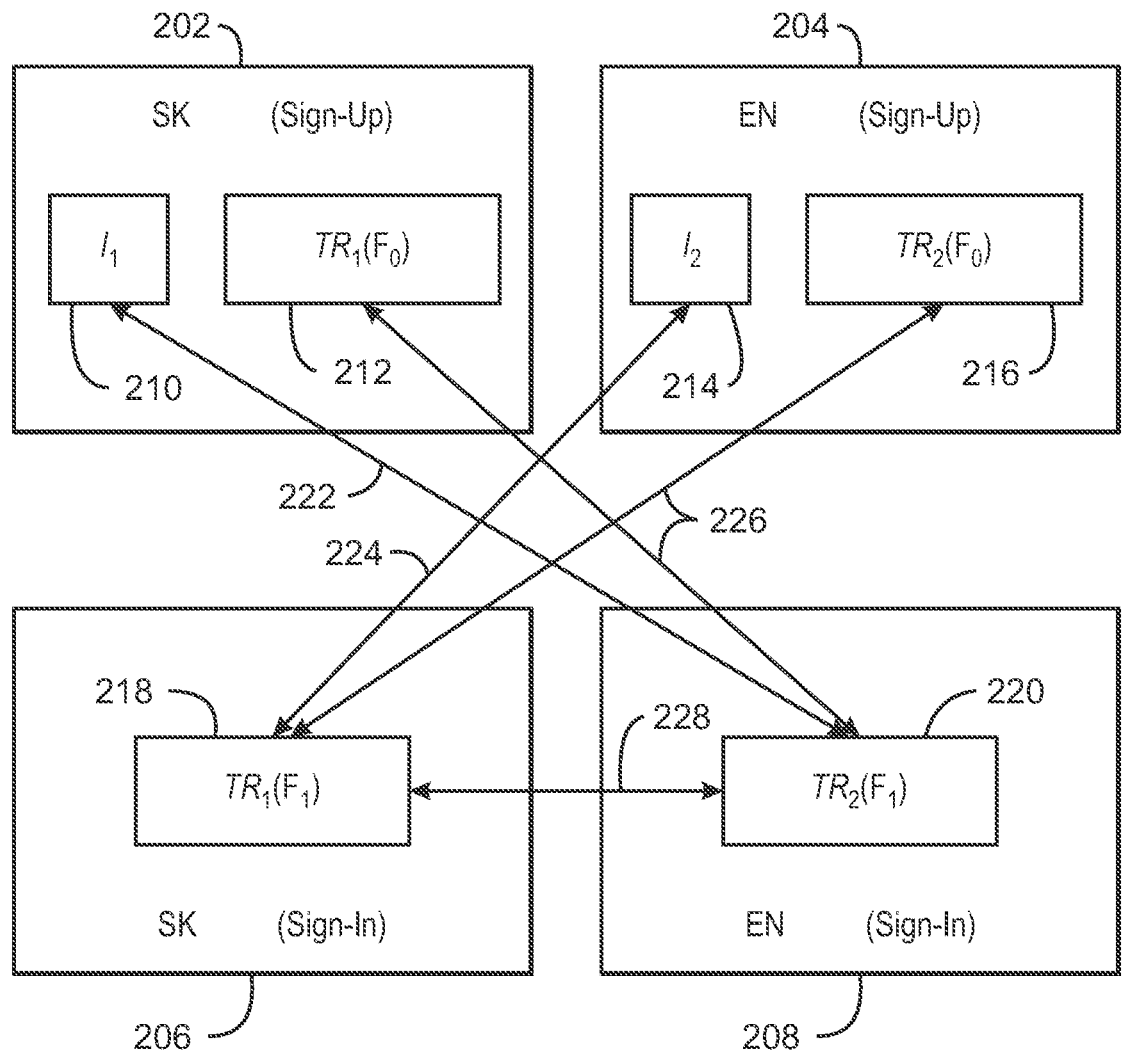
FIG. 2 is a block diagram illustrating an example transformation function cross check used to perform a transformation verification.

FIG. 2 is a block diagram illustrating an example transformation function cross check used to perform a transformation verification. The transformation function cross check 200 can be implemented using the system 100 of FIG. 1, the computing device 400 of FIG. 4, or the computer-readable medium of FIG. 5, via the method 300 of FIG. 3.

The example transformation function cross check 200 of FIG. 2 includes secret keys (SKs) 202 generated at sign-up, encryptions of vectors (EN) 204 generated at sign-up, secret key 206 generated at sign-in, and encryption of vector (EN) 208 generated at sign-in. The secret keys 202 $SK(I_1)$ and $SK(TR_1(F_0))$ may be generated from a first security vector $I_1$ 210 and a transformed vector $TR_1(F_0)$ 212 including first transformation of a first template $F_0$. The encryptions 204 includes a second security vector $I_2$ 214 and a transformed vector $TR_2(F_0)$ 216 including second transformation of the first template $F_0$. In various examples, the first security vector $I_1$ 210 and the second security vector $I_2$ 214 may be vectors with binary values. As one example, $I_1=(1,0,0,0,\ldots)$ and $I_2=(0,1,0,0,\ldots)$, where the ellipses indicate a series of zeros to match the dimensions of $I_1$ and $I_2$ with the dimension of the template $F_0$ plus two dimensions for the two extra elements added at the beginning of the transformed templates. The secret key (SK) 206 is computed from a first transformation of a second template $TR_1(F_1)$ 218. As one example, the first transformation may be defined using Eqn. 1. The encryption 208 is used to encrypt a transformed vector $TR_2(F_1)$ 220 including a second transformation of the second template. For example, the second transformation may be defined by Eqn. 2.

The transformation function cross check includes four tests, including a first test 224, a second test 226, a third test 228, and a fourth test 230. These four tests 224-230 are described in greater detail with respect to Eqns. 3-6 below. For example, during a sign-up, a client may compute a template $F_0$ and the values $SK(TR_1(F_0))$, $EN(TR_2(F_0))$, $SK(I_1)$, and $EN(I_2)$, wherein vector $I_1$ is $(1,0,0,0,\ldots)$ and vector $I_2$ is $(0,1,0,0,\ldots)$. These security vectors $I_1$ and $I_2$ included during sign-up may be based on the transformation functions $TR_1(y)$ and $TR_2(x)$. In some examples, any number of additional security vectors may be included. For example, the additional security vectors may be based on attributes of additional transformation functions used. A server may receive and store these encrypted vectors.

At runtime or sign-in, a client may send the server secret key $SK(w_1)$ and encrypted vector $EN(w_2)$, where $w_1$ and $w_2$ are transformed vectors. The transformed vectors $w_1$ and $w_2$ may be generated based on a transformation of a template received during sign-in. For example, the transformation function cross check 200 can be used to ensure that there exists a vector $F_1$ such that $w_1=TR_1(F_1)$ and $w_2=TR_2(F_1)$, where $F_1$ is a second template is computed by the client and transformed correctly according to a protocol.

In various examples, the transformation function cross check 200 can include a number of tests. For example, the tests may be performed using the security vectors received at setup in or sign-up and sign-in or runtime. In some examples, the test may include computing a number of inner products. A first test 222 may calculate an inner product between the vector 210 $I_1$ used to compute the secret key $SK(I_1)$ 202 and the transformed vector $w_2$ 220 and compare the result to the value one. For example, the first test 222 may be performed using the equation:

$$DEC(SK(I_1),EN(w_2))=\langle I_1,w_2\rangle=1 \qquad \text{Eqn. 3}$$

where the transformed vector $w_2=TR_2(F_1)$ and the inner product $\langle I_1, w_2\rangle$ is compared to the value 1. The second test 224 may calculate an inner product between a transformed vector $w_1$ 218 used to compute secret key $SK(w_1)$ 202 and the security vector $I_2$ 214 and compare the result to the value 1. For example, the second test 224 may be performed using the equation:

$$DEC(SK(w_1),EN(I_2))=\langle w_1,I_2\rangle=1 \qquad \text{Eqn. 4}$$

where the transformed vector $w_1=TR_1(F_1)$. A third test 226 may compare an inner product calculated between the transformed vector $w_1$ 218 and transformed vector $TR_2(F_0)$ 216 with an inner product calculated between the transformed vector $TR_1(F_0)$ 212 and transformed vector $w_2$ 220. If the inner products are equal, then the third test 226 may pass. Otherwise, the third test 226 may fail. For example, the third test 226 may be performed using the equation:

$$DEC(SK(w_1),EN(TR_2(F_0)))=DEC(SK(TR_1(F_0)),EN(w_2)) \qquad \text{Eqn. 5}$$

where originally encrypted transformed vector $w_1=TR_1(F_1)$ and originally encrypted transformed vector $w_2=TR_2(F_1)$. A fourth test 228 may calculate and compare an inner product between the transformed vector $w_1$ 218 and transformed vector $w_2$ 220 to zero. Because both ciphers are encryptions of the same point, the distance should be 0. For example, the fourth test 228 may be performed using the equation:

$$DEC(SK(w_1),EN(w_2))=0 \qquad \text{Eqn. 6}$$

where, again, transformed vector $w_1=TR_1(F_1)$ and transformed vector $w_2=TR_2(F_1)$. For example, if no distance exists between In various examples, if all four tests are passed, then it is highly probable that for some vector $F_1$ that both $w_1=TR_1(F_1)$ and $w_2=TR_2(F_1)$, and thus that the cipher $EN(w_2)$ sent by the client is in fact $EN(TR_2(F_1))$ as specified by the protocol. If the transformations are valid, the tests 224-230 will pass. Otherwise, assuming randomly distributed faces or other biometric features, there is a probability of at most 0.005 passing invalid transformations using all four tests 224-230. Although there may be a small probability of all four tests passing even though there does not exist a vector $F_1$ such that both $w_1=TR_1(F_1)$ and $w_2=TR_2(F_1)$, this probability may be further reduced by adding random faces. For example, the probability may be lowered generating additional random templates during sign-up or setup, storing the encrypted vectors for each of them, and repeating the third test using Eqn. 5 for each of the additional random templates. For example, the well-formedness of the transformations may be verified relative to any fabricated face or other fabricated biometric feature, not necessarily just relative to the original F0 given at sign-up. Therefore, more fictitious faces FF1, FF2, . . . , FFN may be added and the verification performed using these additional fictitious faces. For each of these additional fictitious faces FF1, FF2, . . . , FFN, the client may provide at sign-in the same pair of ciphers provided for the real F0—including SK(TR1(FF1)), EN(TR2(FF1). The third test corresponding to Eqn. 5 may then be performed for each of these additional fictitious faces to reduce the probability that the verification passes illegal transformations. Moreover, the Euclidean distance between $F_0$ and $F_1$ is incidentally computed by the third test using Eqn. 5. For example, the distance function may be defined by the equation:

$$\text{DEC}(\text{SK}(\text{TR}_1(F_0)),\text{EN}(\text{TR}_2(F_1)))=<\text{TR}_1(F_0),\text{TR}_2(F_1)> \quad \text{Eqn. 7}$$

where the inner product $<\text{TR}_1(F_0),\text{TR}_2(F_1)>$ may represent the squared Euclidean distance between templates $F_0$ and $F_1$. In some examples, this Euclidean distance can be used for testing proximity. For example, the proximity may be used for authentication. In various examples, the distance function may be used to authenticate based on a threshold distance. For example, the authentication using the distance function 222 may be performed in response to the transformation function cross check 200 has passed. In various examples, if the threshold distance is not exceeded, then a user may be authenticated. Otherwise, if the threshold distance is exceeded, then the user may not be authenticated.

The four tests described above may be used to prevent a variety of attacks. This is demonstrated by the following proof. For example, let a real vector at signup be $[F_1, F_2, \ldots, F_{128}]$. Therefore, the server may receive the encryption of $[1, \Sigma F_i^2, F_1, F_2, \ldots, F_{128}]$ denoted as $F_{0C}$. The server may also receive the secret key computed from the vector $(\Sigma y_i^2, 1, -2y_1, -2y_2, \ldots, -2y_{128})$. The server may also receive the encryption of an additional vector $[0,1,0,0,\ldots,0]$ $I_C$ and a secret key computed from the additional vector $[1,0,0,0,\ldots,0]$ $I_K$. In some examples, a malicious client may send the following ciphertexts at sign-in or runtime: the encryption of vector $[F_{Ca}, F_{Cb}, F_{C2}, \ldots, F_{C128}]$ denoted as $F_C$ and a secret key computed from the vector $[F_{Ka}, F_{Kb}, F_{K1}, F_{K2}, \ldots, F_{K128}]$ denoted as $F_K$. Further, assume that nothing is known about the content of vectors $[F_{Ca}, F_{Cb}, F_{C2}, \ldots, F_{C128}]$ and $[F_{Ka}, F_{Kb}, F_{K1}, F_{K2}, \ldots, F_{K128}]$. For example, these vectors may include any scalar values. In addition, assume that $F_C$ and $F_K$ are the result of a correct execution of an encryption and key generation algorithm for their respective contents. Given these assumptions, information can be deduced about vectors $[F_{Ca}, F_{Cb}, F_{C2}, \ldots, F_{C128}]$ and $[F_{Ka}, F_{Kb}, F_{K1}, F_{K2}, \ldots, F_{K128}]$ from a series of tests as follows. First, assuming a legitimate face feature $F_i$ is within $[-100,100]$ and that the computations are done in a modular arithmetic $Z_p$ with a prime p, such that p>100. Using tests corresponding to Eqns. 3 and 4, DEC$(F_K,I_C)=1$ and DEC$(I_K,F_C)=1$, it is proven that $F_{Ca}=F_{Kb}=1$. So the encryption of the vector $F_C$ is $[1, F_{Cb}, F_{C2}, \ldots, F_{C128}]$ and the secret key computed from the vector is $[F_{Ka}, 1, F_{K1}, F_{K2}, \ldots, F_{K128}]$. Using a third test corresponding to Eqn. 5, DEC$(F_{0K},F_C)=$DEC$(F_K,F_{0C})$, a dot product may be calculated on both sides to obtain the equation:

$$\Sigma F_i^2 + F_{Cb} + \Sigma -2F_i * FC_i = F_{Ka} + \Sigma F_i^2 + \Sigma(F_i * F_{Ki}) \quad \text{Eqn. 8}$$

which can be rewritten as:

$$F_{Ka} - F_{Cb} + \Sigma(F_{Ki} + 2F_{Ci}) = 0 \quad \text{Eqn. 9}$$

Assuming that some i holds that $F_{Ki}+2F_{Ci}!=0$, then Eqn. 9 depends on the value $F_i$. Assuming all other face features $F_j$ are held constant, then Eqn. 9 can be rewritten as:

$$A + F_i * B = 0 \quad \text{Eqn. 10}$$

where A and B are constants, and B!=0. Since $Z_p$ is an additive group, and $Z_q/\{0\}$ is a multiplicative group, then Eqn. 10 can be solved by $F_i=(-A)*B^{-1}$. Thus, there is a single solution in $Z_p$ for $F_i$ that satisfies Eqn. 9. Fi is within $[-100.100]$, and at most one value in the range can satisfy Eqn. 9. For a value of $F_i$ that was chosen randomly and uniformly, this has a probability of at most 1/201. This may be referred to as a rare-false-positive event. The probability of a rare-false-positive can be reduced by the third test of Eqn. 5 against multiple random face vectors F. Assuming that rare-false-positive event has not occurred, if Eqn. 9 is satisfied, then for every i, $F_{Ki}=2F_{Ci}$. Substituting this into Eqn. 9, produces $F_{Ka}-F_{Cb}=0$, hence $F_{Ka}=F_{Cb}$. Therefore, the encryption of vector $F_C$ is $[1, F_{Cb}, F_{C2}, \ldots, F_{C128}]$ and the secret key computed from the vector is $[F_{Cb}, 1, -2F_{C1}, -2F_{C2}, \ldots, -2F_{C128}]$. Using test four of Eqn. 6 DEC$(F_K, F_C)=0$. Calculating the inner sum results in $2F_{Cb}+\Sigma(-2F_{Ci}^2)=0$, and solving for $F_{Cb}$ results in $F_{Cb}=\Sigma(F_{Ci}^2)$. Therefore, the encryption of the vector $F_C$ is $[1, \Sigma(F_{Ci}^2), F_{C2}, \ldots, F_{C128}]$ and the secret key $F_K$ computed from the vector is $[\Sigma(F_{Ci}^2), 1, -2F_{C1}, -2F_{C2}, \ldots, -2F_{C128}]$. Therefore, both the encryption of the vector $F_C$ and the secret key $F_K$ are well formed.

It is to be understood that the block diagram of FIG. 2 is not intended to indicate that the example transformation function cross check 200 is to include all of the components shown in FIG. 2. Rather, the transformation function cross check 200 can include fewer or additional components not illustrated in FIG. 2 (e.g., additional vectors, transformations, sign-ups, sign-ins, etc.).

Figure 3:
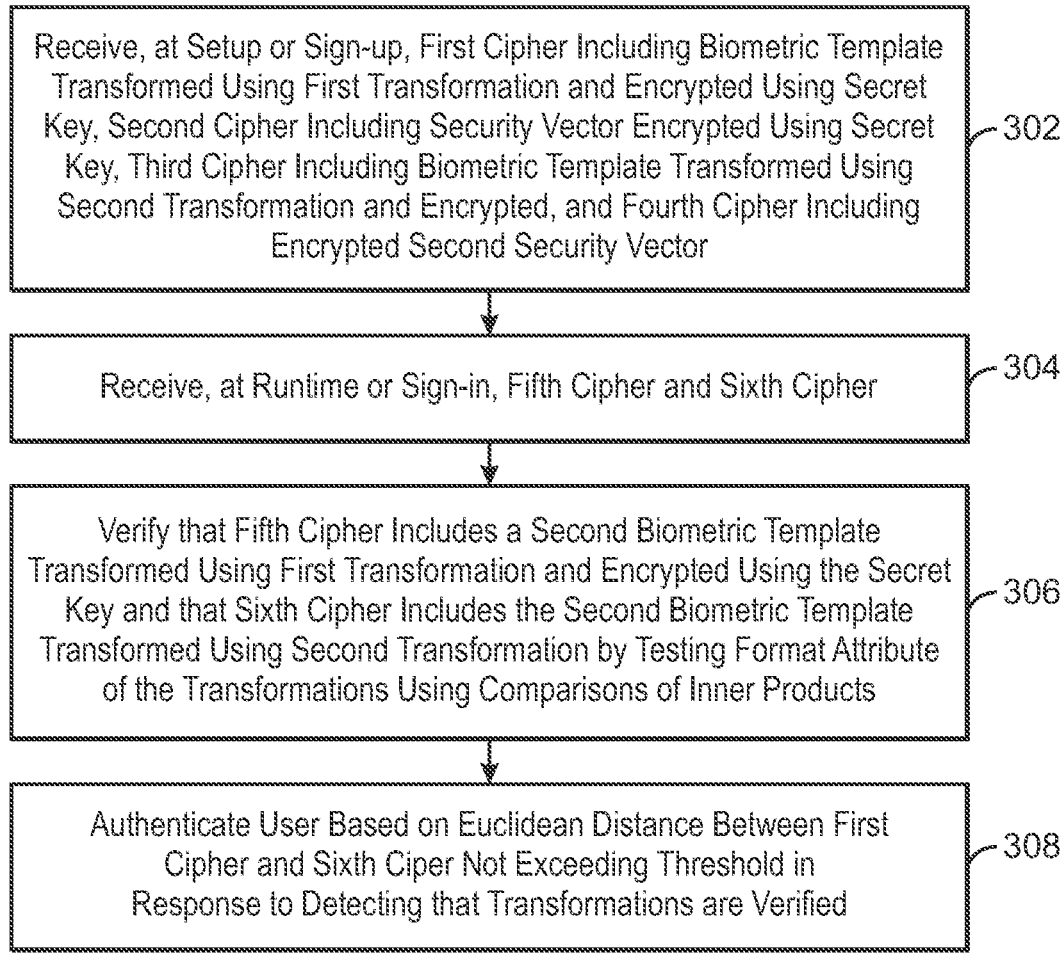
FIG. 3 is a block diagram of an example method that can authenticate using a transformation verification.

FIG. 3 is a process flow diagram of an example method that can authenticate using a transformation verification. The method 300 can be implemented with any suitable computing device, such as the computing device 300 of FIG. 3 and is described with reference to the system 100 and transformation function cross check 200 of FIGS. 1 and 2. For example, the methods described below can be implemented by the computing device 400 of FIG. 4.

At block 302, a first cipher including a biometric template transformed using a first transformation and encrypted using a secret key, a second cipher including a security vector encrypted using the secret key, a third cipher including the biometric template transformed using a second transformation and encrypted, and a fourth cipher including an encrypted second security vector are received at a setup or sign-up. In some examples, the biometric template may have been generated using features such as facial features, fingerprints, iris features, etc. The first cipher, second cipher, third cipher, and fourth cipher may be received from a client device at an authentication server. In some examples, the biometric template may be functionally encrypted. In various examples, the biometric template may be homomorphically encrypted. In various examples, the security vectors are based on a format of the transformation functions. For example, the security vectors may be generated based on the location of a value of one in the transformation functions.

At block 304, a fifth cipher and a sixth cipher are received at a runtime or sign-in. For example, the fifth cipher and the sixth cipher may be received from the same or a different client device requesting authentication of a user.

At block 306, a verification is performed that the fifth cipher includes a second biometric template transformed using the first transformation and encrypted using the secret key and that the sixth cipher includes the second biometric template transformed using the second transformation by testing a format attribute of the transformation functions using comparisons of inner products. For example, the transformations may be verified using one or more tests calculating inner products based on two or more of the ciphers. In some examples, a first test calculates an inner product based on the second cipher and the sixth cipher. For example, the first test may include calculating an inner product of the vectors encrypted by the second cipher and the sixth cipher. In various examples, a second test calculates an inner product based on the fifth cipher and the fourth cipher. For example, the second test may include calculating an inner product of the vectors encrypted by the fifth cipher and the fourth cipher. In some examples, a third test compares an inner product based on the first cipher and the sixth cipher with an inner product calculated based on the fifth cipher and the third cipher. For example, the second test may include calculating an inner product of the vectors encrypted by the first cipher and the sixth cipher and an inner product of the vectors encrypted by the fifth cipher and the third cipher. In various examples, a fourth test compares an inner product calculated based on the fifth cipher and the sixth cipher to zero. For example, the fourth test may include calculating an inner product of the vectors encrypted by the fifth cipher and the sixth cipher.

At block 308, a user is authenticated based on the Euclidean distance between the first cipher and the sixth cipher not exceeding a threshold in response to detecting that the transformations are verified. For example, the authentication is performed by comparing the distance to a threshold. If the distance exceeds the threshold, then the user may not be verified. If the distance does not exceed the threshold, then the user may be authenticated. For example, the authentication may be a biometric authentication. In various examples, biometric authentication may include face recognition, fingerprint identification, hand geometry biometrics, a retina scan, an iris scan, a signature, or voice analysis, among other types of biometric authentication. In some examples, the biometric authentication may be a behavioral biometric authentication that is based on unique patterns exhibited when users interact with a user interface of a device. For example, behavioral biometric authentication may include analyzing patterns of typing, finger pressure, device angles, etc.

The process flow diagram of FIG. 3 is not intended to indicate that the operations of the method 300 are to be executed in any particular order, or that all of the operations of the method 300 are to be included in every case. Additionally, the method 300 can include any suitable number of additional operations. For example, the method may include adding additional random templates during sign-up or setup to lower a probability of verifying an incorrect transformation.

In some scenarios, the techniques described herein may be implemented in a cloud computing environment. As discussed in more detail below in reference to at least FIGS. 4-7, a computing device configured to authenticate using a transformation function cross check may be implemented in a cloud computing environment. It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
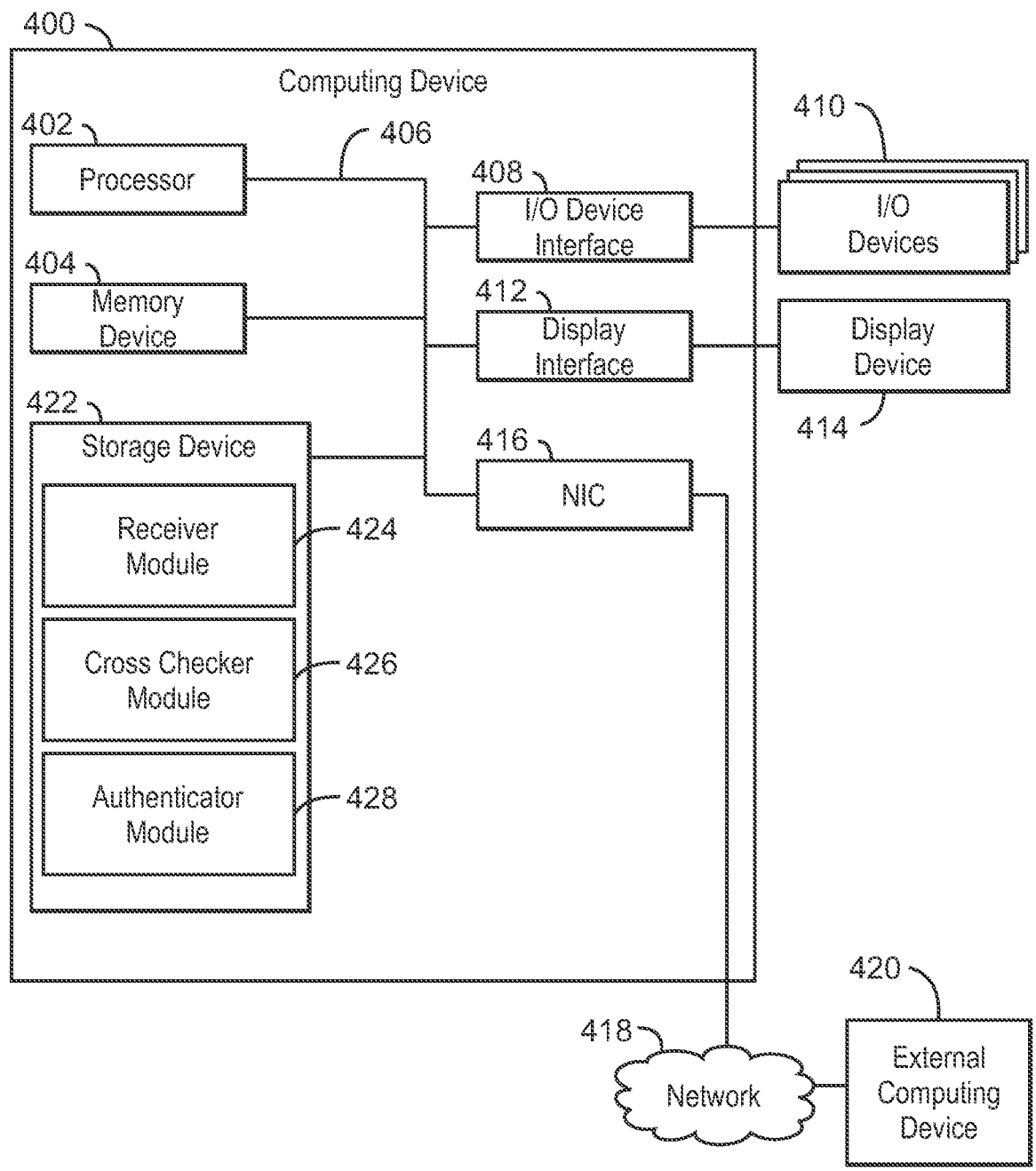
FIG. 4 is a block diagram of an example computing device that can authenticate using a transformation verification.

FIG. 4 is block diagram of an example computing device that can authenticate using a transformation verification. The computing device 400 may be for example, a server, desktop computer, laptop computer, tablet computer, or smartphone. In some examples, computing device 400 may be a cloud computing node. Computing device 400 may be described in the general context of computer system executable instructions, such as program modules, being executed by a computer system. Generally, program modules may include routines, programs, objects, components, logic, data structures, and so on that perform particular tasks or implement particular abstract data types. Computing device 400 may be practiced in distributed cloud computing environments where tasks are performed by remote processing devices that are linked through a communications network. In a distributed cloud computing environment, program modules may be located in both local and remote computer system storage media including memory storage devices.

The computing device 400 may include a processor 402 that is to execute stored instructions, a memory device 404 to provide temporary memory space for operations of said instructions during operation. The processor can be a single-core processor, multi-core processor, computing cluster, or any number of other configurations. The memory 404 can include random access memory (RAM), read only memory, flash memory, or any other suitable memory systems.

The processor 402 may be connected through a system interconnect 406 (e.g., PCI®, PCI-Express®, etc.) to an input/output (I/O) device interface 408 adapted to connect the computing device 400 to one or more I/O devices 410. The I/O devices 410 may include, for example, a keyboard and a pointing device, wherein the pointing device may include a touchpad or a touchscreen, among others. The I/O devices 410 may be built-in components of the computing device 400, or may be devices that are externally connected to the computing device 400.

The processor 402 may also be linked through the system interconnect 406 to a display interface 412 adapted to connect the computing device 400 to a display device 414. The display device 414 may include a display screen that is a built-in component of the computing device 400. The display device 414 may also include a computer monitor, television, or projector, among others, that is externally connected to the computing device 400. In addition, a network interface controller (NIC) 416 may be adapted to connect the computing device 400 through the system interconnect 406 to the network 418. In some embodiments, the NIC 416 can transmit data using any suitable interface or protocol, such as the internet small computer system interface, among others. The network 418 may be a cellular network, a radio network, a wide area network (WAN), a local area network (LAN), or the Internet, among others. An external computing device 420 may connect to the computing device 400 through the network 418. In some examples, external computing device 420 may be an external webserver 420. In some examples, external computing device 420 may be a cloud computing node.

The processor 402 may also be linked through the system interconnect 406 to a storage device 422 that can include a hard drive, an optical drive, a USB flash drive, an array of drives, or any combinations thereof. In some examples, the storage device may include a receiver module 424, a cross checker module 426, and an authenticator module 428. The receiver module 424 can receive, at a setup or sign-up, a first cipher including a biometric template transformed using a first transformation and encrypted using a secret key, a second cipher including a security vector encrypted using the secret key, a third cipher including the biometric template transformed using a second transformation and encrypted, and a fourth cipher including an encrypted second security vector. For example, the security vectors may be based on a format of the transformation functions. In some examples, the security vectors may be generated based on the location of a value of one in the transformation functions. The receiver module 424 can also receive, at a runtime or sign-in, a fifth cipher and a sixth cipher. The cross checker module 426 can verify that the fifth cipher includes a second biometric template transformed using the first transformation and encrypted using the secret key and that the sixth cipher includes the second biometric template transformed using the second transformation by testing a format attribute of the transformation functions using comparisons of inner products. For example, the cross checker module 426 can execute any number of tests. In some examples, the cross checker module 426 can execute a first test that calculates an inner product calculated based on the second cipher and the sixth cipher. For example, the first test may include calculating an inner product of the vectors encrypted by the second cipher and the sixth cipher. In various examples, the cross checker module 426 can execute a second test that calculates an inner product calculated based on the fifth cipher and the fourth cipher. For example, the second test may include calculating an inner product of the vectors encrypted by the fifth cipher and the fourth cipher. In some examples, the cross checker module 426 can execute a third test that compares an inner product calculated based on the first cipher and the sixth cipher with an inner product calculated based on the fifth cipher and the third cipher. For example, the second test may include calculating an inner product of the vectors encrypted by the first cipher and the sixth cipher and an inner product of the vectors encrypted by the fifth cipher and the third cipher. In various examples, the cross checker module 426 can execute a fourth test that compares an inner product calculated based on the fifth cipher and the sixth cipher to zero. For example, the fourth test may include calculating an inner product of the vectors encrypted by the fifth cipher and the sixth cipher. The authenticator module 428 can authenticate a user based on the Euclidean distance between the first cipher and the sixth cipher not exceeding a threshold in response to detecting that the transformations are verified. In some examples, the authenticator module 428 can deny a user access to a service in response to detecting that the transformations are not verified or that the Euclidean distance exceeds the threshold.

It is to be understood that the block diagram of FIG. 4 is not intended to indicate that the computing device 400 is to include all of the components shown in FIG. 4. Rather, the computing device 400 can include fewer or additional components not illustrated in FIG. 4 (e.g., additional memory components, embedded controllers, modules, additional network interfaces, etc.). Furthermore, any of the functionalities of the receiver module 424, the cross checker module 426, and the authenticator module 428 may be partially, or entirely, implemented in hardware and/or in the processor 402. For example, the functionality may be implemented with an application specific integrated circuit, logic implemented in an embedded controller, or in logic implemented in the processor 402, among others. In some embodiments, the functionalities of the receiver module 424, cross checker module 426, and authenticator module 428 can be implemented with logic, wherein the logic, as referred to herein, can include any suitable hardware (e.g., a processor, among others), software (e.g., an application, among others), firmware, or any suitable combination of hardware, software, and firmware.

Figure 5:
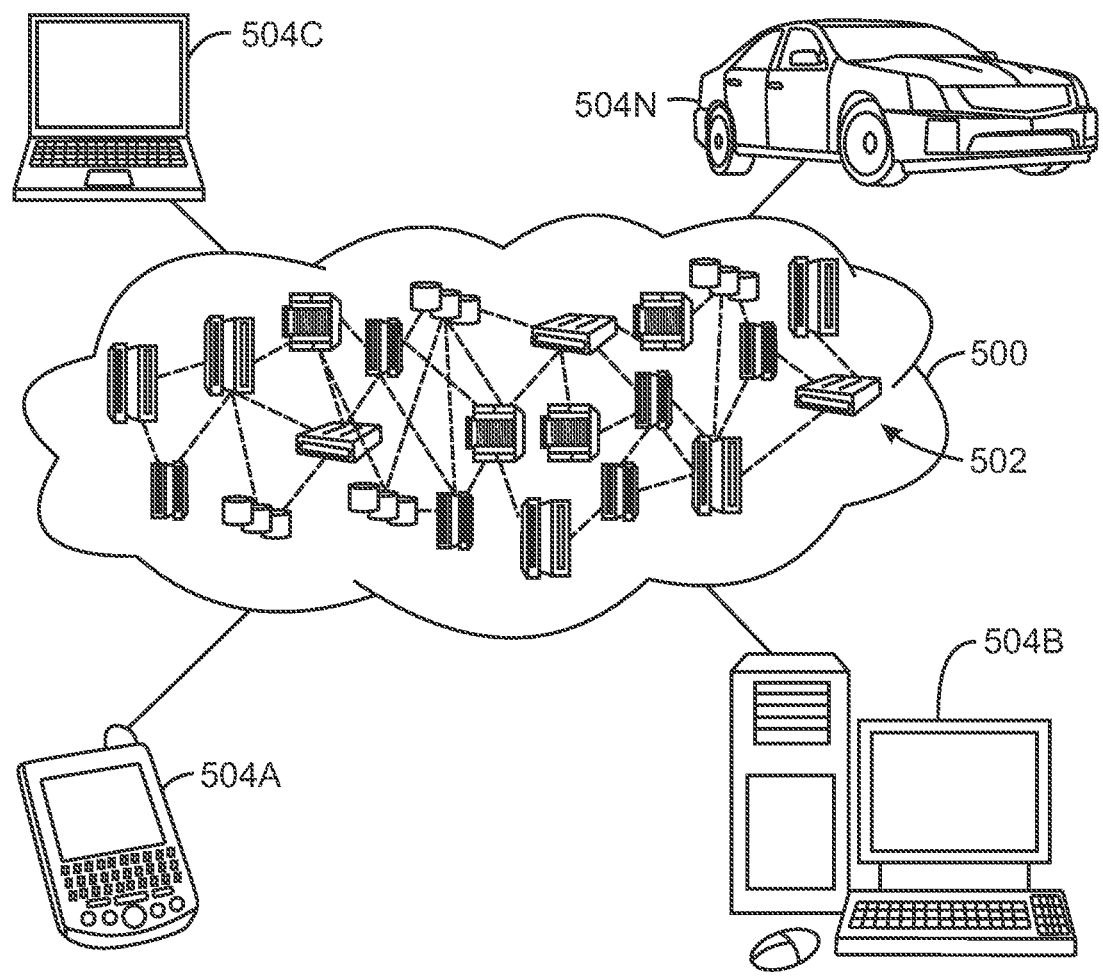
FIG. 5 is a diagram of an example cloud computing environment according to embodiments described herein.

Referring now to FIG. 5, illustrative cloud computing environment 500 is depicted. As shown, cloud computing environment 500 comprises one or more cloud computing nodes 502 with which local computing devices used by cloud consumers, such as, for example, personal digital assistant (PDA) or cellular telephone 504A, desktop computer 504B, laptop computer 504C, and/or automobile computer system 504N may communicate. Nodes 502 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 504A-N shown in FIG. 5 are intended to be illustrative only and that computing nodes 502 and cloud computing environment 500 can communicate with any type of computerized device over any type of network and/or network addressable connection (e.g., using a web browser).

Figure 6:
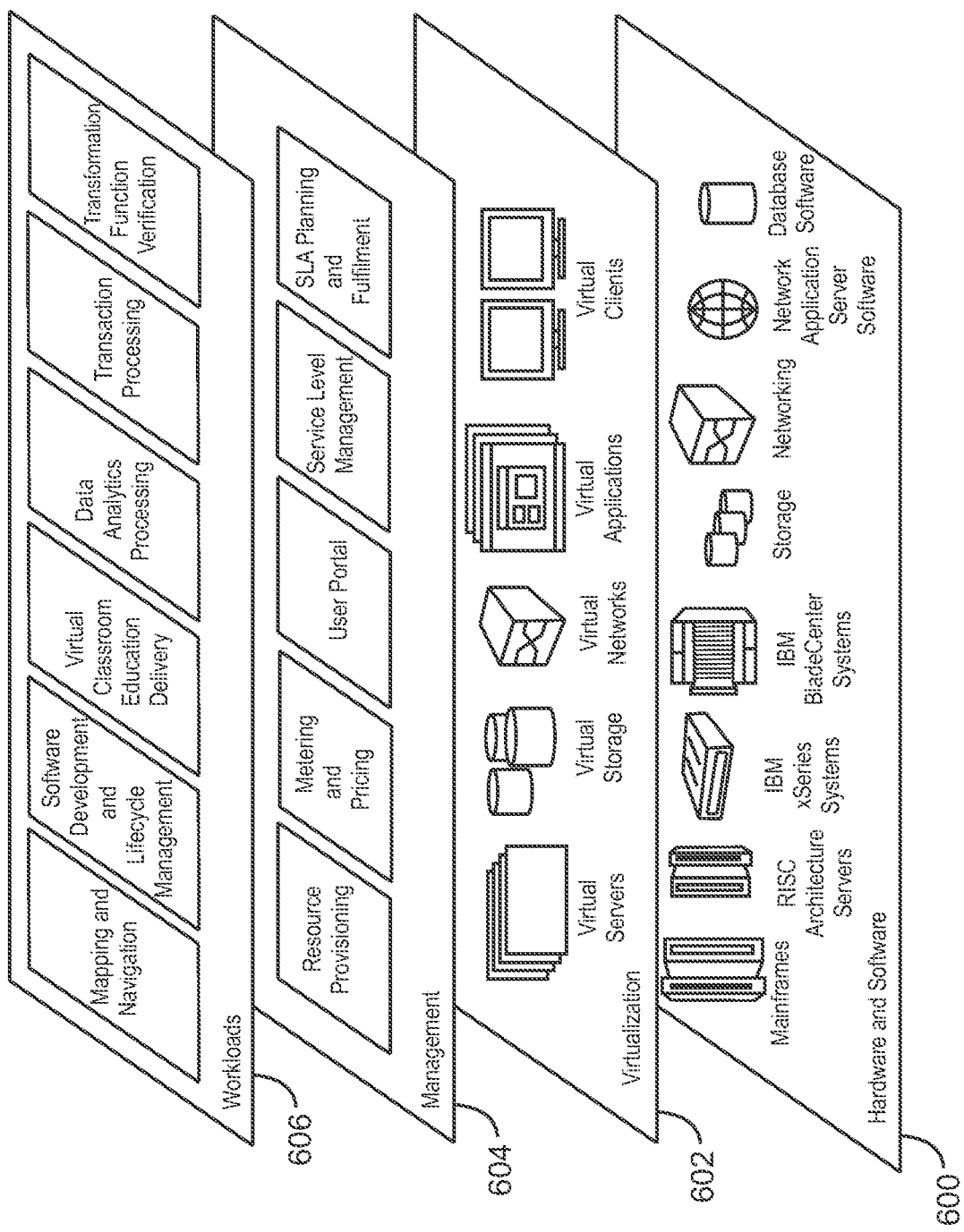
FIG. 6 is a diagram of an example abstraction model layers according to embodiments described herein.

Referring now to FIG. 6, a set of functional abstraction layers provided by cloud computing environment 500 (FIG. 5) is shown. It should be understood in advance that the components, layers, and functions shown in FIG. 6 are intended to be illustrative only and embodiments of the invention are not limited thereto. As depicted, the following layers and corresponding functions are provided.

Hardware and software layer 600 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 602 provides an abstraction layer from which the following examples of virtual entities may be provided: virtual servers; virtual storage; virtual networks, including virtual private networks; virtual applications and operating systems; and virtual clients. In one example, management layer 604 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 606 provides examples of functionality for which the cloud computing environment may be utilized. Examples of workloads and functions which may be provided from this layer include: mapping and navigation; software development and lifecycle management; virtual classroom education delivery; data analytics processing; transaction processing; and transformation function verification.

The present invention may be a system, a method and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the techniques. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 7:
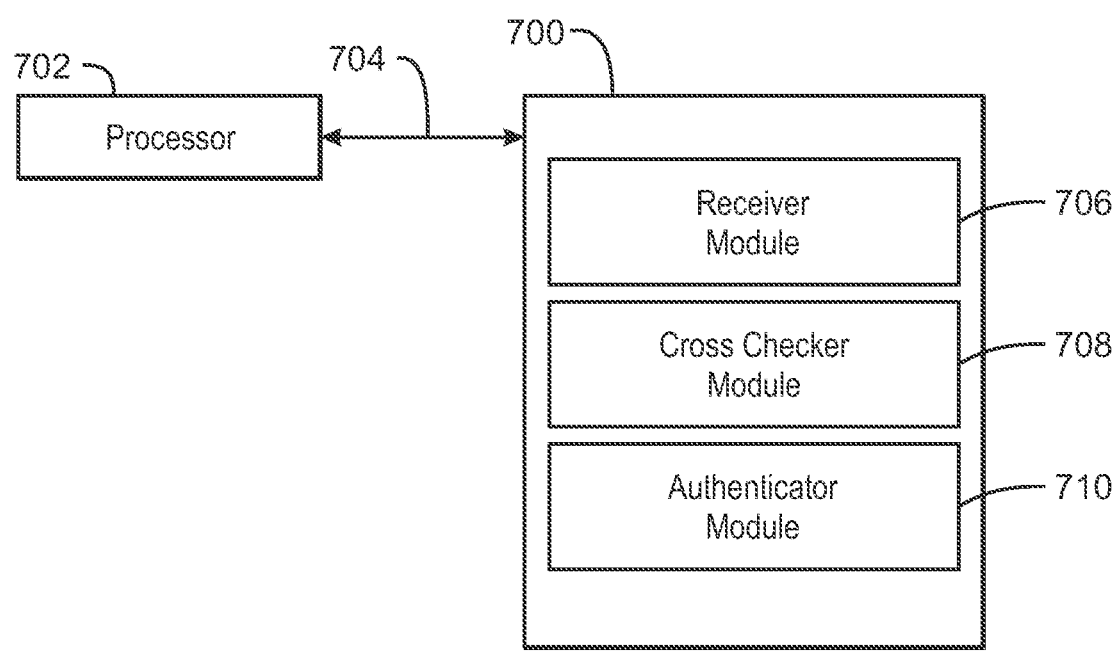
FIG. 7 is an example tangible, non-transitory computer-readable medium that can authenticate using a transformation verification.

Referring now to FIG. 7, a block diagram is depicted of an example tangible, non-transitory computer-readable medium 700 that can authenticate using a transformation verification. The tangible, non-transitory, computer-readable medium 700 may be accessed by a processor 702 over a computer interconnect 704. Furthermore, the tangible, non-transitory, computer-readable medium 700 may include code to direct the processor 702 to perform the operations of the method 300 of FIG. 3.

The various software components discussed herein may be stored on the tangible, non-transitory, computer-readable medium 700, as indicated in FIG. 7. For example, a receiver module 706 includes code to receive, at a setup or sign-up, a first cipher including a biometric template transformed using a first transformation and encrypted using a secret key, a second cipher including a security vector encrypted using the secret key, a third cipher including the biometric template transformed using a second transformation and encrypted, and a fourth cipher including an encrypted second security vector. The receiver module 706 also includes code to receive, at a runtime or sign-in, a fifth cipher and a sixth cipher. In some examples, the receiver module 706 includes code to generate the security vectors based on a format of the transformation functions. A cross checker module 708 includes code to verify that the fifth cipher includes a second biometric template transformed using the first transformation and encrypted using the secret key and that the sixth cipher includes the second biometric template transformed using the second transformation by testing a format attribute of the transformation functions using comparisons of inner products. The cross checker module 708 further includes code to calculate an inner product calculated based on the second cipher and the sixth cipher. For example, the cross checker module 708 also includes code to calculate an inner product of the vectors encrypted by the second cipher and the sixth cipher. The cross checker module 708 also includes code to calculate an inner product calculated based on the fifth cipher and the fourth cipher. For example, the cross checker module 708 also includes code to calculate an inner product of the vectors encrypted by the fifth cipher and the fourth cipher. The cross checker module 708 also includes code to compare an inner product based on the first cipher and the sixth cipher with an inner product calculated based on the fifth cipher and the third cipher. For example, the cross checker module 708 also includes code to calculate an inner product of the vectors encrypted by the first cipher and the sixth cipher and an inner product of the vectors encrypted by the fifth cipher and the third cipher. The cross checker module 708 also includes code to compare an inner product calculated based on the fifth cipher and the sixth cipher to zero. For example, the cross checker module 708 also includes code to calculate an inner product of the vectors encrypted by the fifth cipher and the sixth cipher. An authenticator module 710 includes code to authenticate a user based on the Euclidean distance between the first cipher and the sixth cipher not exceeding a threshold in response to detecting that the transformations are verified. The authenticator module 710 also includes code to deny a user access to a service in response to detecting that the transformations are not verified or that the Euclidean distance exceeds the threshold. It is to be understood that any number of additional software components not shown in FIG. 7 may be included within the tangible, non-transitory, computer-readable medium 700, depending on the particular application.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. It is to be understood that any number of additional software components not shown in FIG. 7 may be included within the tangible, non-transitory, computer-readable medium 700, depending on the specific application.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising a hardware processor to:
   receive, at a setup or sign-up, a first cipher comprising a biometric template transformed using a first transformation and encrypted using a secret key, a second cipher comprising a security vector encrypted using the secret key, a third cipher comprising the biometric template transformed using a second transformation and encrypted, and a fourth cipher comprising an encrypted second security vector;
   receive, at a runtime or sign-in, a fifth cipher and a sixth cipher;
   verify that the fifth cipher comprises a second biometric template transformed using the first transformation and encrypted using the secret key and that the sixth cipher comprises the second biometric template transformed using the second transformation by testing a format attribute of the transformation functions using comparisons of inner products; and
   authenticate a user based on the Euclidean distance between the first cipher and the sixth cipher not exceeding a threshold in response to detecting that the transformations are verified.

2. The system of claim 1, wherein the security vectors are based on a format of the transformation functions.

3. The system of claim 1, wherein the hardware processor is to verify the transformations of the fifth cipher and the sixth cipher using a first test that calculates an inner product based on the second cipher and the sixth cipher.

4. The system of claim 1, wherein the hardware processor is to verify the transformations of the fifth cipher and the sixth cipher using a second test that calculates an inner product calculated based on the fifth cipher and the fourth cipher.

5. The system of claim 1, wherein the hardware processor is to verify the transformations of the fifth cipher and the sixth cipher using a third test that compares an inner product calculated based on the first cipher and the sixth cipher with an inner product calculated based on the fifth cipher and the third cipher.

6. The system of claim 1, wherein the hardware processor is to verify the transformations of the fifth cipher and the sixth cipher using a fourth test that compares an inner product calculated based on the fifth cipher and the sixth cipher to zero.

7. The system of claim 1, wherein the hardware processor is to generate the security vectors based on the location of a value of one in the first transformation and the second transformation.

8. A computer-implemented method, comprising:
   receiving, via a processor at a setup or sign-up, a first cipher comprising a biometric template transformed using a first transformation and encrypted using a secret key, a second cipher comprising a security vector encrypted using the secret key, a third cipher comprising the biometric template transformed using a second transformation and encrypted, and a fourth cipher comprising an encrypted second security vector;
   receiving, via the processor at a runtime or sign-in, a fifth cipher and a sixth cipher;
   verifying, via the processor, that the fifth cipher comprises a second biometric template transformed using the first transformation and encrypted using the secret key and that the sixth cipher comprises the second biometric template transformed using the second transformation by testing a format attribute of the transformation functions using comparisons of inner products; and
   authenticating, via the processor, a user based on the Euclidean distance between the first cipher and the sixth cipher not exceeding a threshold in response to detecting that the transformations are verified.

9. The computer-implemented method of claim 8, comprising generating the security vectors based on a format of the transformation functions.

10. The computer-implemented method of claim 8, wherein verifying the transformations of the fifth cipher and the sixth cipher comprises calculating an inner product based on the second cipher and the sixth cipher.

11. The computer-implemented method of claim 8, wherein verifying the transformations of the fifth cipher and the sixth cipher comprises calculating an inner product based on the fifth cipher and the fourth cipher.

12. The computer-implemented method of claim 8, wherein verifying the transformations of the fifth cipher and the sixth cipher comprises comparing an inner product calculated based on the first cipher and the sixth cipher with an inner product calculated based on the fifth cipher and the third cipher.

13. The computer-implemented method of claim 8, wherein verifying the transformations of the fifth cipher and the sixth cipher comprises comparing an inner product calculated based on the fifth cipher and the sixth cipher to zero.

14. The computer-implemented method of claim 8, comprising adding additional random templates during the setup or the sign-up to lower a probability of verifying an incorrect transformation.

15. A computer program product for authentication, the computer program product comprising a computer-readable storage medium having program code embodied therewith, wherein the computer readable storage medium is not a transitory signal per se, the program code executable by a processor to cause the processor to:

receive, at a setup or sign-up, a first cipher comprising a biometric template transformed using a first transformation and encrypted using a secret key, a second cipher comprising a security vector encrypted using the secret key, a third cipher comprising the biometric template transformed using a second transformation and encrypted, and a fourth cipher comprising an encrypted second security vector;

receive, at a runtime or sign-in, a fifth cipher and a sixth cipher;

verify that the fifth cipher comprises a second biometric template transformed using the first transformation and encrypted using the secret key and that the sixth cipher comprises the second biometric template transformed using the second transformation by testing a format attribute of the transformation functions using comparisons of inner products; and authenticate a user based on the Euclidean distance between the first cipher and the sixth cipher not exceeding a threshold in response to detecting that the transformations are verified.

16. The computer program product of claim 15, further comprising program code executable by the processor to generate the security vectors based on a format of the transformation functions.

17. The computer program product of claim 15, further comprising program code executable by the processor to calculate an inner product calculated based on the second cipher and the sixth cipher.

18. The computer program product of claim 15, further comprising program code executable by the processor to calculate an inner product calculated based on the fifth cipher and the fourth cipher.

19. The computer program product of claim 15, further comprising program code executable by the processor to compare an inner product based on the first cipher and the sixth cipher with an inner product calculated based on the fifth cipher and the third cipher.

20. The computer program product of claim 15, further comprising program code executable by the processor to compare an inner product calculated based on the fifth and the sixth cipher to zero.

* * * * *